Patented May 13, 1952

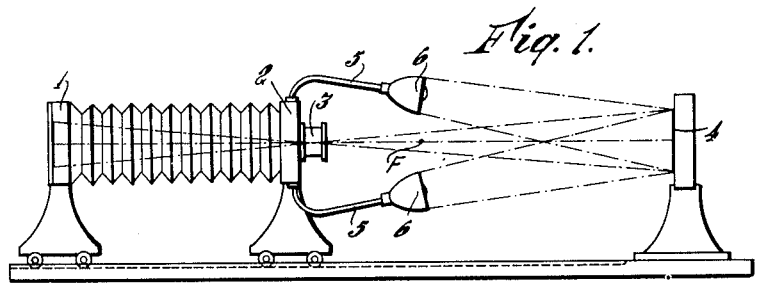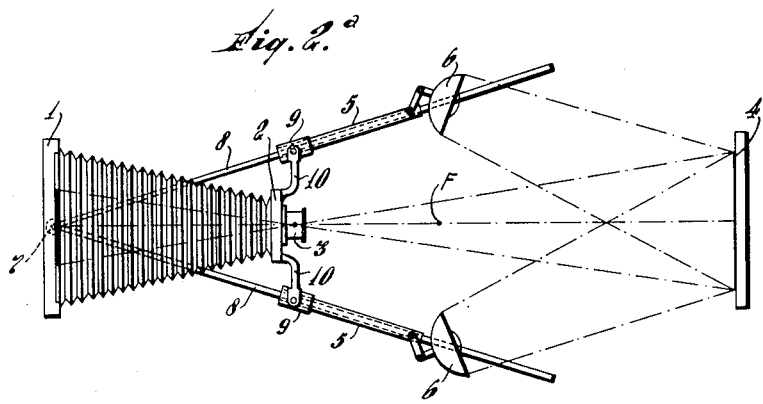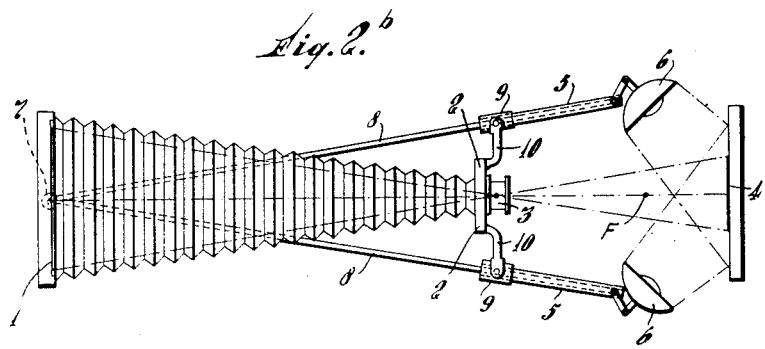

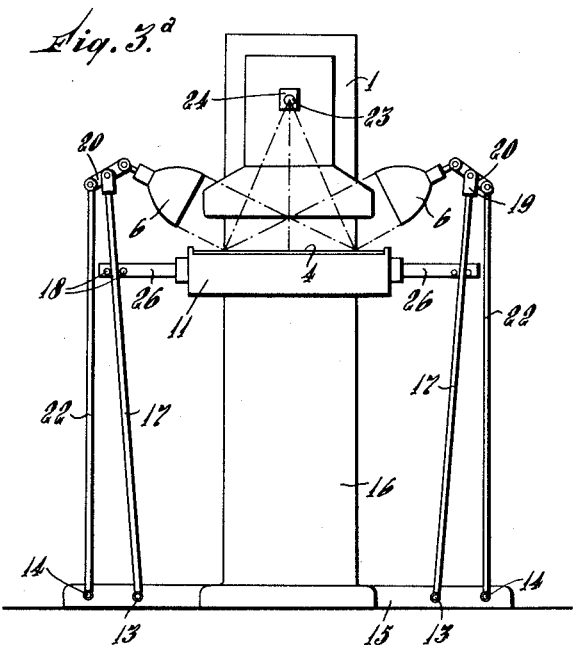
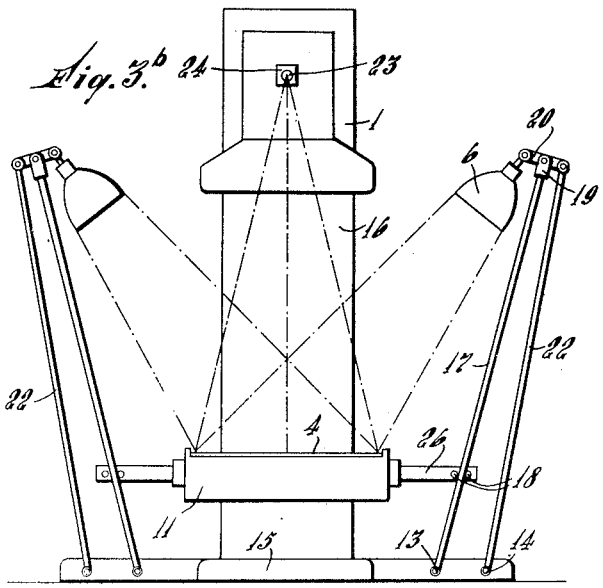

2,596,376

UNITED STATES PATENT OFFICE 2,596,376

PHOTOGRAPHIC REPRODUCTION APPARATUS WITH CONSTANT EXPOSURE TIME REGARDLESS OF THE SCALE OF REPRODUCTION

Henricus J. A. de Goeij, Overveen, Netherlands, assignor, by mesne assignments, to N. V. Exploitatie Maatschappij "Quod Bonum," Amsterdam, Netherlands Application July 28, 1948, Serial No. 41,008
In the Netherlands August 9, 1947

5 Claims. (Cl. 88—24)

In the photographic reproduction of objects by the reflection of light from the latter, the original is usually illuminated by two or more sources of light, such as arc-lamps, arranged in fixed positions on either side of the said original; when reducing the original the intensity of the image on the focusing screen will then be considerably greater than when enlarging it. If the lamps are not moved this intensity will vary by about the square of the magnification factor when enlarging or reducing the original.

If an object is first so photographed as to be reduced to ⅓ and if subsequently the same object is so photographed as to be 2 times enlarged the time of exposure required for taking the second photograph will be about 36 times as long as that required for taking the first.

In actual practice the photographer—when enlarging or reducing the original at a certain scale—will never calculate how much longer or shorter he will have to expose than when taking a picture of equal size, though theoretically this would be possible.

Various attempts have already been made to avoid this difficulty by so regulating the intensity of the light on the focusing screen that this intensity remains constant when enlarging or reducing.

The light, for example, may be dimmed or intensified by means of a slide-resistor which is so coupled to the moving parts of the objective lens system that the intensity of the light on the focusing screen remains constant. Stops have also been constructed, the diameter of the aperture of which changes in such a manner that the intensity of the light on the focusing screen is constant, regardless of the scale of reproduction; in this case too the automatic variation of the diameter of the stop aperture is determined by the movement of the objective lens system along the optical axis.

According to this invention the constant intensity on the focusing screen is obtained in apparatus for the photographic reproduction of objects by means of light reflected from the object in a simple manner by arranging the source of light generally in the plane passing through the principal focus of the objective lens at the side of the latter facing toward the object or original, or so that the plane which passes through the source or sources of light and which is perpendicular to the optical axis of the objective lens system intersects this axis at or adjacent to the principal focus of the lens system. In this way, the distance of the source of light to the original, or object, is variable in such a way that the source of light will always throw a quantity of light on the original which is equal to the intensity with which the original would be illuminated if the source of light were placed at distance $f$=focal length of the objective lens system, in front of the objective lens system.

This will be seen from the following:

Let the object distance $= v$

The image distance $= b$

The magnification $E = \dfrac{b}{v}$

The intensity on the original $= I$

The intensity on the focusing screen $= i$

According to the lens formula:

$$\frac{1}{b} + \frac{1}{v} = \frac{1}{f}$$

Now $b = E.v.$ and thus $$\frac{1}{E.v.} + \frac{1}{v} = \frac{1}{f}$$

$$\frac{1+E}{E.v.} = \frac{1}{f}$$

$$f + E.f. = E.v.$$

or $$E = \frac{f}{V-f} \tag{1}$$

Now the greater the magnification, the weaker the intensity on the focusing screen; this decrease in intensity is proportionate to the square of the linear magnification $E$.

Consequently:

$$i = I\left(\frac{1}{E}\right)^2$$

If now $i$ is required to be constant, then $$i = \frac{I}{E^2} = \text{constant or } I = \text{const. } E^2 \tag{2}$$

If (1) is now substituted for $E$ in (2), the formula will run:

$$I = C\frac{f^2}{(V-f)^2}$$

or:

$$I(v-f)^2 = \text{constant}$$

In other words the intensity $I$ on the original must be inversely proportional to the square of $(v-f)$, or: the distance of the lamp to the original must be equal to $(v-f)$: the lamp, therefore, must be placed at the distance $f$ before the objective lens.

It is not possible of course, to place the source of light in the optical axis; the lamp or lamps should be placed on either side of the objective, in fact, so far aside that they will not cause any reflection on the original that can reach the objective.

If originals of small height or width are reproduced, for example, strips of text or a few lines, as is the case with a certain photo-composing machine, it will suffice to place the lamps only a few centimetres from the optical axis on the line which passes through the principal focus, or the focus in the object space of the optical system, and which line is normal to said axis.

The lamps, however, will have to be removed all the farther from the optical axis in a direction normal thereto the larger the original or object is, which is to be reproduced, or the smaller the scale is on which the original or object is reproduced.

If the lamps must be placed far from the optical axis, however, they may no longer move along a line which is normal to the optical axis and passes through the principal focus, for the distance from lamp to original will become larger than $(v-f)$ in that case, and, moreover, the intensity on the original will become smaller according as the rays of light make a greater angle of incidence with the normal.

The source of light may be held in proper position by means of a lever or lever system having a fulcrum before or behind the objective, which lever or lever system my turn in a plane parallel to the optical axis and which, furthermore, is guided by a guide means located at the end of a rod of fixed length, which rod is secured to the objective holder or to the model carrying board, the arrangement being such that the plane which passes through the source of light and which is normal to the optical axis, intersects the latter in the focus of the object space. The lever may be pivoted to the focusing screen holder, the distance of the guide means to the optical axis being about equal to half the width of the model or movable model-board. The fulcrum may also be located on one side of and below the model-board, in which case the guide means is fitted to a guide rod secured to the model-board and which by its movement controls the oscillations of a quadrangular lever system constituted by two rods, pivoted at their one ends to the frame or base of the apparatus. Both pivots disposed generally in the same plane normal to the optical axis, but one of the pivots, the outer one, at a greater distance from the axis than the other pivot, the inner one.

The quadrangle is closed by a double lever, to the median fulcrum of which the inner rod is pivoted, by means of a fork, whereas the other or outer rod is pivoted to the outer end of the double lever. The source of light is mounted to that end of the short double lever which faces the objective.

The invention will now be illustrated with reference to the accompanying drawings in which the figures show some embodiments of apparatus according to the invention.

Fig. 1 schematically shows a side elevation of such an apparatus used, for example, in a photo-composing machine. The holder 1 for the photo-sensitive material is connected with the holder 2 for the objective 3 by means of a bellows. The positive letter-image 4 is projected onto the photo-sensitive material on a reduced or enlarged scale. It is illuminated by lamps 6 secured to arms 5. Said arms are immovably connected to the objective-holder 2. The plane passing through both lamps intersects the optical axis in the principal focus.

When photographing larger objects, e. g. of 40 x 50 cm. a simple mechanism is provided by means of which the lamps will be the farther removed from the optical axis the more the scale is reduced on which the original or object is to be reproduced. This movement of the lamps 6 is achieved under the control of levers 8 or 17, Figs. 2 and 3, pivotally secured at fixed fulcrums 7 or 13 either before or behind the objective 3 or 23 in such a manner that the lever is adapted to move in a plane parallel to the optical axis.

A fixed arm 10 or 26 is secured to the objective carrier 2 or to the model-board 11, which arm is located in the same plane as the one in which said lever 8 or 17 is adapted to turn. At the free end of this arm, 10 or 26, a guide member, sleeve 9 or cam pins or rollers 18 is provided in such a manner that when the fixed arm 10 or 26 moves in the plane running parallel to the optical axis, the lever 8 or 17 can form an increasing or decreasing angle with said optical axis. A source of light 6 is so mounted on the lever mechanism that the distance between two planes which are normal to the optical axis and the one of which passes through the optical centre of the objective and the other through the source of light, is equal, or substantially equal, to the focal length of the objective.

Figures 2a and 2b show an embodiment in plan-view of such a mechanism for a horizontal camera having a straight line optical system, Figures 3a and 3b show a front elevation of an embodiment for a vertical camera having a broken optical axis.

In Figures 2a and b a fulcrum 7 is located beneath the focusing-screen holder 1, to which fulcrum the lever 8 is hingedly connected. On the objective holder 2 the arm 10 is mounted which at its end carries pivotally an oscillatable sleeve 9. The distance of the oscillatable sleeve to the optical axis is about equal to half the width of the model-board 4. A tube 5 is secured to the sleeve 9 projecting therefrom towards the object holder 4, and in which tube the lever 8 can slide. At the end of the tube 5 is the source of light 6, approximately in the focal plane of the objective and in the object space, or at the place where the plane, which passes through the principal focus F and is normal to the optical axis, intersects the rod 8.

Figure 2a shows a position in which reduced pictures are taken with the camera, whereas Figure 2b shows a position in which the camera makes enlarged photographs.

In Figures 3a-b a vertical prism camera is depicted, in which 23 represents the objective, 24 the prism and 1 the focusing screen holder. At the base 15 of the camera there is a fulcrum 13 to which the lever 17 is hingedly secured.

The guide arm 26 carrying the guide rollers 18 at its end, is secured to the model-board 11 which may be slid up and down along the support 16. The lever 17 is guided by the cam rollers 18. The lever 17 is at its end provided with a fork 19 in which a short double lever 20 is pivotally secured. The source of light 6 throwing a beam of light on the original 4, is mounted on that side of the lever 20 which faces the camera.

The other end of the lever 20 is provided with a fulcrum to which a rod 22 is secured, which rod is pivoted to the base 15 in a point 14.

The length of the levers 17 and 20, of the rod 22 and the distance between the fulcrums 13 and 14 have been so selected that when the model-board 11 moves down and the lever 17 moves outwards in consequence, the source of light is directed farther downwards, so that the beam of light will always cover the original 4.

Figure 3a shows a position in which an enlargement is made whereas Figure 3b shows a position in which the camera reduces.

I claim:

1. Apparatus for the photographic reproduction of objects by means of light reflected from the object; said apparatus comprising a reproduction camera including an objective lens system, a carrier supporting said objective lens system and a holder for photosensitive material; a holder for the object to be reproduced; frame means supporting said object holder, lens system carrier and photosensitive material holder for relative movement thereof to permit focusing of an image of the object projected by said lens system on said photosensitive material holder for varied scales of reproduction; a source of light adapted to illuminate an object in said object holder; support means for said light source positioning the latter substantially in a plane extending through the principal focus of said lens system normal to the optical axis of the latter and at the side thereof facing said object holder; and means connected to said support means operative to displace said light source in the direction substantially at right angles to said axis in proportion to changes in the distance along said axis between said principal focus and said object holder.

2. Apparatus according to claim 1; wherein said support means is mounted on said objective lens system carrier for movement with the latter in the direction parallel to said optical axis.

3. Apparatus according to claim 1 wherein said support means includes an arm extending laterally from said lens system carrier, a guide sleeve pivotally mounted on said arm for swinging in a plane parallel to said optical axis, and means mounting said light source on said sleeve at a location spaced from the swinging axis of the sleeve and substantially within said plane extending through the principal focus of the lens system; and wherein said means operative to displace the light source includes a lever member slidably extending through said guide sleeve, and pivot means connected to one end of said lever member and defining a pivoting axis for the latter extending through said optical axis at the side of said lens system carrier facing toward said holder for the photosensitive material so that said lever member is effective to swing said guide sleeve when said lens system carrier is moved along said optical axis.

4. Apparatus according to claim 3; wherein said arm is of a length sufficient to space said guide sleeve from said optical axis a distance equal to approximately half the width of the object in said object holder.

5. Apparatus according to claim 1; wherein said lens system carrier is fixed and said object holder and photosensitive material holder are movable relative to said carrier; and wherein said support means includes a quadrilateral link system having two spaced elongated members pivotally mounted at adjacent ends on said frame means at the side of said lens system carrier facing toward the object holder and spaced from said carrier for swinging in a plane having said optical axis lying therein, a lever member pivotally connected intermediate its length to the one of said elongated members disposed closer to said optical axis and at one end to the other of said elongated members, and means mounting said light source on the other end of said lever member; and wherein said means for displacing the light source includes means on said object holder slidably engaging one of said elongated elements and operative to oscillate the latter in response to movement of said object holder along said optical axis for swinging and tilting said light source relative to said optical axis.

HENRICUS J. A. DE GOEIJ.

REFERENCES CITED

The following references are of record in the file of this patent:

UNITED STATES PATENTS

| Number | Name | Date |
| --- | --- | --- |
| 1,597,598 | Jones | Aug. 24, 1926 |

FOREIGN PATENTS

| Number | Country | Date |
| --- | --- | --- |
| 610,146 | Germany | Mar. 4, 1935 |
| 506,822 | Great Britain | Aug. 30, 1937 |
| 687,770 | Germany | Feb. 5, 1940 |